United States Patent
Soga et al.

(10) Patent No.: US 11,612,882 B2
(45) Date of Patent: Mar. 28, 2023

(54) POLYCONDENSATION CATALYST FOR PRODUCING POLYESTER AND PRODUCTION OF POLYESTER USING THE SAME

(71) Applicant: SAKAI CHEMICAL INDUSTRY CO., LTD., Osaka (JP)

(72) Inventors: Yuhei Soga, Osaka (JP); Akihiro Kamon, Osaka (JP)

(73) Assignee: SAKAI CHEMICAL INDUSTRY CO., LTD., Osaka (JP)

(*) Notice: Subject to any disclaimer, the term of this patent is extended or adjusted under 35 U.S.C. 154(b) by 317 days.

(21) Appl. No.: 16/769,313

(22) PCT Filed: Dec. 11, 2018

(86) PCT No.: PCT/JP2018/045525
§ 371 (c)(1),
(2) Date: Jun. 3, 2020

(87) PCT Pub. No.: WO2019/124166
PCT Pub. Date: Jun. 27, 2019

(65) Prior Publication Data
US 2021/0170371 A1 Jun. 10, 2021

(30) Foreign Application Priority Data
Dec. 22, 2017 (JP) .............................. JP2017-246688

(51) Int. Cl.
*B01J 27/18* (2006.01)
*B01J 21/06* (2006.01)
*C08G 63/85* (2006.01)
*C08L 67/02* (2006.01)

(52) U.S. Cl.
CPC ......... *B01J 27/1806* (2013.01); *B01J 21/063* (2013.01); *C08G 63/85* (2013.01); *C08L 67/02* (2013.01)

(58) Field of Classification Search
CPC ..... B01J 27/1806; B01J 21/063; C08G 63/85; C08G 63/183; C08G 63/80; C08L 67/02; C08K 3/24; C08K 2003/321; C08K 2003/325; C08K 2003/326; C08K 9/02
USPC ..................................................... 502/208
See application file for complete search history.

(56) References Cited

U.S. PATENT DOCUMENTS

| | | | |
|---|---|---|---|
| 9,289,749 B2 * | 3/2016 | Tabata | C08G 63/84 |
| 2010/0041913 A1 | 2/2010 | Umaba et al. | |
| 2012/0172571 A1 | 7/2012 | Tabata et al. | |
| 2015/0258530 A1 | 9/2015 | Umaba et al. | |
| 2016/0229953 A1 | 8/2016 | Kamon et al. | |

FOREIGN PATENT DOCUMENTS

| | | | |
|---|---|---|---|
| CA | 909998 | * | 9/1972 |
| CN | 101389688 | | 3/2009 |
| CN | 102482406 | | 5/2012 |
| JP | 46-3395 | | 1/1971 |
| JP | 49-57092 | | 6/1974 |
| JP | 49-35075 | | 9/1974 |
| JP | 63-243126 | | 10/1988 |
| JP | 9-291141 | | 11/1997 |
| JP | 10-212119 | | 8/1998 |
| JP | 2001-64377 | | 3/2001 |
| JP | 2001-114885 | | 4/2001 |
| JP | 2002-308973 | | 10/2002 |
| JP | 2005-162925 | | 6/2005 |
| JP | 2006-188567 | | 7/2006 |
| JP | 2008-63 3 84 | | 3/2008 |
| JP | 2008-115243 | | 5/2008 |
| JP | 2011168635 | * | 9/2011 |
| WO | 2014/021206 | | 2/2014 |
| WO | 2015/041271 | | 3/2015 |

OTHER PUBLICATIONS

International Search Report (ISR) dated Mar. 5, 2019 in International (PCT) Application No. PCT/JP2018/045525.

* cited by examiner

*Primary Examiner* — Taylor V Oh
(74) *Attorney, Agent, or Firm* — Wenderoth, Lind & Ponack, L.L.P.

(57) ABSTRACT

The invention provides a polycondensation catalyst for producing polyester by an esterification reaction or a transesterification reaction of a dicarboxylic acid or an ester-forming derivative thereof and a glycol, wherein the polycondensation catalyst comprises particles of a water-insoluble or hardly water-soluble phosphate having on the surfaces a coating layer of titanic acid in an amount, of 0.1 to 100 parts by weight in terms of $TiO_2$ per 100 parts by weight of the phosphate.

10 Claims, No Drawings

POLYCONDENSATION CATALYST FOR PRODUCING POLYESTER AND PRODUCTION OF POLYESTER USING THE SAME

TECHNICAL FIELD

The present invention relates to a polycondensation catalyst for producing polyester and a method for producing polyester using the same.

Polyesters represented by polyethylene terephthalate, polybutylene terephthalate and polyethylene naphthalate are superior in mechanical and chemical properties, and depending upon their respective properties, they are used in a wide variety of fields including, for example, fibers for clothing and industrial materials, films or sheets for packaging materials and magnetic tapes, bottles which are hollow molded articles, casings for electric and electronic appliances, and other types of molded articles or components.

A representative polyester, namely, a polyester composed of an aromatic dicarboxylic acid component and an alkylene glycol component as main components, such as polyethylene terephthalate, is produced by preparing bis(2-hydroxyethyl)terephthalate (BHET) or oligomers containing the same by an esterification reaction of terephthalic acid and ethylene glycol or a transesterification reaction of dimethyl terephthalate and ethylene glycol, and then subjecting the BHET and the oligomers to melt-polycondensation in a vacuum at high temperatures in the presence of a polycondensation catalyst.

As a polycondensation catalyst for producing such polyesters, antimony trioxide has been heretofore in wide use. Antimony trioxide is a catalyst inexpensive and superior in catalytic activity; however, it has some problems. For example, antimony metal is deposited during the polycondensation, resulting in darkening of the obtained polyester, or contaminating of the obtained polyester with foreign matters. In addition, because antimony trioxide is inherently toxic (see Patent Document 1), development of catalysts free of antimony has been awaited in recent years.

Such being the case, for example, a catalyst comprising a germanium compound is known as a catalyst superior in catalytic activity, providing polyester superior in color tone and thermal stability (see Patent Document 2). However, the catalyst is not only expensive, but also easy to distill out of the reaction system during the polymerization. As a result, the concentration of the catalyst in the reaction system changes as time passes to makes it difficult to control the polycondensation.

On the other hand, it is already known that titanium compounds such as glycol titanates or titanium alkoxides can be used as a polycondensation catalyst for production of polyester by transesterification of dimethyl terephthalate and ethylene glycol (for example, see Patent Documents 3 and 4). However, there is a problem in the catalyst that the obtained polyester is thermally degraded to be easily colored when it is melt-molded.

Therefore, in recent years, various new methods for producing high quality polyester with a high productivity using a polycondensation catalyst, containing titanium have been proposed. For example, it has been proposed to prepare a polycondensation catalyst by hydrolyzing a titanium halide or a titanium alkoxide to obtain a titanium hydroxide, heating, dehydrating and drying the titanium hydroxide to obtain a solid titanium compound as a polycondensation catalyst. (See, for example, Patent Documents 5 and 6).

However, including the above-mentioned titanium compounds, some of the conventionally known polycondensation catalysts containing titanium have a high polymerization activity per unit weight of metal, but in many cases, they provide polyester which still tends to be thermally degraded and colored during melt. molding.

Then, recently, a polycondensation catalyst for producing polyester which comprises particles of a solid base such as hydrotalcite having on the surfaces a coating layer formed of titanic acid has been proposed. This polycondensation catalyst provides a high molecular weight polyester with a high polymerization activity per unit weight of the metal while suppressing the decomposition of the polyester produced during the polycondensation. It is additionally regarded that the polyester obtained is hardly colored due to its thermal deterioration (see Patent Document 7).

However, in the production of polyester using the polycondensation catalyst comprising particles of a solid base inclusive of hydrotalcite having a coating layer of titanic acid on the surface, it is considered desirable to perform polycondensation in the presence of a phosphorous-containing stabilizer such as phosphoric acid, a phosphoric acid ester or phosphorous acid in order to suppress the high activity of titanium thereby to improve the color tone and heat resistance of the polyester obtained. When the polycondensation is performed in the absence of the phosphorous-containing stabilizer, a problem occurs that polyester impaired in heat resistance or much colored may be obtained.

Further, depending on the application of polyester, it may be desirable that the polyester does not contain a phosphorus-containing stabilizer. Therefore, there is a strong demand for a polycondensation catalyst for producing a polyester superior in color tone without the use of a phosphorus-containing stabilizer.

PRIOR ART

Patent Literature

Patent Literature 1: JP-H 09-291141 A
Patent Literature 2: JP-H 10-212119 A
Patent Literature 3: JP-S 46-3395 B
Patent Literature 4: JP-S 49-57092 A
Patent Literature 5: JP 2001-064377 A
Patent Literature 6: JP 2001-114885 A
Patent Literature 7: JP 2006-188567 A

SUMMARY OF INVENTION

Technical Problem

The present inventors have conducted intensive studies to solve the above-described problems involved in the conventional polycondensation catalyst for producing polyester. As a result, they have found that the use of water-insoluble or hardly water-soluble particles of a phosphate having on the surfaces a coating layer formed of titanic acid as a polycondensation catalyst for producing polyester provides a high molecular weight polyester with a high polymerization activity per unit weight, of the metal while the decomposition of the produced polyester is suppressed during the production of polyester. In addition, the catalyst provides polyester which hardly suffers coloring due to thermal deterioration even in the absence of a phosphorus-containing stabilizer such as phosphoric acid, a phosphoric acid ester, and phosphorous acid. Thus, they have reached the invention.

Accordingly, it is an object the invention to provide a novel polycondensation catalyst for producing polyester which does not contain antimony, is superior in catalytic activity, and provides a polyester superior in color tone even in the absence of a phosphorus-containing stabilizer. It is a further object of the invention to provide a method for producing the polycondensation catalyst for producing polyester and a method for producing polyester using the polycondensation catalyst.

Solution to Problem

The invention provides a polycondensation catalyst for producing polyester by an esterification reaction or a transesterification reaction of a dicarboxylic acid or an ester-forming derivative thereof and a glycol, wherein the polycondensation catalyst comprises particles of a water-insoluble or hardly water-soluble phosphate having on the surfaces a coating layer of titanic acid in an amount of 0.1 to 100 parts by weight in terms of $TiO_2$ per 100 parts by weight of the phosphate.

The invention also provides a method for producing polyester, comprising subjecting a dicarboxylic acid or an ester-forming derivative thereof and a glycol to polycondensation by an esterification reaction or a transesterification reaction in the presence of the polycondensation catalyst.

In particular, as a preferred embodiment, the invention provides a method for producing polyester comprising preparing oligomers containing a bis(hydroxyalkyl) ester of an aromatic dicarboxylic acid by an esterification reaction or a transesterification reaction of the aromatic dicarboxylic acid or an ester-forming derivative thereof and an alkylene glycol, and then subjecting the oligomers to melt-polycondensation in the presence of the polycondensation catalyst.

The invention further provides a method for producing a polycondensation catalyst for producing polyester, comprising:

while maintaining a water slurry containing the water-insoluble or hardly water-soluble particles of a phosphate at a temperature in the range of 5 to 100° C., adding to the water slurry a titanium compound in an amount of 0.1 to 100 parts by weight in terms of $TiO_2$ relative to 100 parts by weight of the phosphate, and adding an alkali to the resulting mixture to hydrolyze the titanium compound at a pH in the range of 3 to 12 to form a coating layer of titanic acid on the surfaces of the particles of the phosphate; and drying and disintegrating the particles of the phosphate having the coating layer on the surfaces.

EFFECT OF INVENTION

The use of the polycondensation catalyst according to the invention in the production of polyester by an esterification reaction or a transesterification reaction of a dicarboxylic acid or its ester-forming derivative and a glycol provides a high molecular weight polyester with a high polymerization activity without decomposition of the polyester. The polyester thus obtained has a color tone equal to or superior to the polyester obtained by using an antimony catalyst even without the use of a phosphorus-containing stabilizer.

EMBODIMENTS OF INVENTOIN

The polycondensation catalyst for producing polyester according to the invention is a catalyst for producing polyester by an esterification reaction or transesterification reaction of a dicarboxylic acid or its ester-forming derivative thereof and a glycol, which comprises particles of a water-insoluble or hardly water-soluble phosphate having on the surfaces a coating layer of titanic acid in an amount of 0.1 to 100 parts by weight in terms of $TiO_2$ per 100 parts by weight of the phosphate.

According to the invention, the phosphate is water-insoluble or hardly water-soluble, and preferably has a solubility in water at a temperature of 25° C., that is, a maximum amount of phosphate soluble in 100 g of water at a temperature of 25° C., is 2.00 g or less. The phosphate includes not only orthophosphate but also metaphosphate, pyrophosphate, phosphate glass, phosphite, and hypophosphite.

The counter ion of the phosphate anion is at least one ion of a metal selected from the group consisting of alkaline earth metals, aluminum, titanium, zirconium and zinc. As the alkaline earth metal, calcium or magnesium is particularly preferred.

Accordingly, preferred phosphates include, for example, dibasic magnesium phosphate, tribasic magnesium phosphate, monobasic calcium phosphate, dibasic calcium phosphate, tribasic calcium phosphate, dibasic barium phosphate, tribasic barium phosphate, dibasic aluminum phosphate, tribasic aluminum phosphate, titanium phosphate, zirconium phosphate, zinc hydrogenphosphate, zinc phosphate, magnesium phosphite, magnesium hypophosphite, calcium phosphite, calcium hypophosphite, barium phosphate, aluminum phosphite, zinc phosphite, magnesium pyrophosphate, calcium pyrophosphate, calcium acid pyrophosphate, barium pyrophosphate, titanium pyrophosphate, zirconium pyrophosphate, zinc pyrophosphate, magnesium metaphosphate, calcium metaphosphate, barium metaphosphate, aluminum metaphosphate, zinc metaphosphate and the like.

Among the above-mentioned, preferable phosphates include calcium pyrophosphate, calcium dihydrogenpyrophosphate, tribasic calcium phosphate, dibasic calcium phosphate, magnesium pyrophosphate, tribasic magnesium phosphate and magnesium metaphosphate.

In the invention, the titanic acid is a hydrous titanium oxide represented by the general formula $$TiO_2 \cdot nH_2O$$

wherein n is a numeral satisfying 0<n≤2. Such a titanic acid is obtained, for example, by an alkaline hydrolysis of a certain kind of titanium compounds as described later.

In the present invention, the titanic acid preferably has n in the range of 0.3 to 1.5, particularly preferably in the range of 0.5 to 1.

The polycondensation catalyst for producing polyester of the invention comprises particles of the phosphate having on the surfaces a coating layer formed of titanic acid in an amount of 0.1 to 100 parts by weight in terms of $TiO_2$ relative to 100 parts by weight of the phosphate.

When the amount of the coating layer formed of titanic acid is less than 0.1 part by weight in terms of $TiO_2$ relative to 100 parts by weight of the phosphate, the catalyst has a reduced polymerization activity, and consequently, the reaction time needed is prolonged, and the polyester obtained is liable to be colored because the amount of the phosphate is too large with respect to the titanic acid.

On the other hand, when the amount of the coating layer formed of titanic acid is more than 100 parts by weight in terms of $TiO_2$ relative to 100 parts by weight of the phosphate, the amount of titanic acid is in excess with respect to the phosphate, and the polyester produced is easily decomposed, but also easily colored.

In particular, according to the invention, based on the fact that the obtained polyester is particularly superior in color tone, the amount of the coating layer formed of titanic acid is preferably in the range of 1 to 50 parts by weight, more preferably in the range of 10 to 50 parts by weight, each in terms of $TiO_2$, with respect to 100 parts by weight of the phosphate.

The polycondensation catalyst of the invention is obtained by, while maintaining a water slurry of the water-insoluble or hardly water-soluble particles of phosphate at a temperature in the range of 5 to 100° C., preferably in the range of 25 to 40° C., adding to the water slurry a titanium compound in an amount of 0.1 to 100 parts by weight, preferably 1 to 50 parts by weight, more preferably 10 to 50 parts by weight, in terms of $TiO_2$ relative to 100 parts by weight of the phosphate; adding an alkali to the resulting mixture to hydrolyze the titanium compound at a pH in the range of 3 to 12, preferably in the range of 6 to 8, to form a coating layer of titanic acid on the surfaces of the particles of the phosphate; and drying and disintegrating the resulting product. The drying temperature is preferably in the range of 60 to 180° C., particularly preferably in the range of 100 to 130° C.

The polycondensation catalyst of the invention is obtained by another method. That is, the catalyst is obtained by, while maintaining a water slurry of the particles of the phosphate at a temperature in the range of 5 to 100° C., preferably in the range of 25 to 40° C., adding to the water slurry a titanium compound in an amount of 0.1 to 100 parts by weight, preferably 1 to 50 parts by weight, more preferably 10 to 50 parts by weight, in terms of $TiO_2$, relative to 100 parts by weight of the phosphate together with an alkali at an approximately equivalent ratio, and if necessary with an additional amount of an alkali, to hydrolyze the titanium compound at a pH in the range of 3 to 12, preferably in the range of 6 to 8, to form a coating layer of titanic acid on the surfaces of the particles of the phosphate; drying the resulting product at a temperature in the range of 60 to 180° C., and disintegrating the product.

In the production of the polycondensation catalyst according to the invention, examples of the usable titanium compound which is capable of forming a coating of titanic acid by alkali hydrolysis thereof include titanium halides such as titanium tetrachloride and the like, titanium compounds such as titanyl ammonium oxalate and titanium alkoxides such as titanium tetraisopropoxide. However, the titanium compound is not limited to those examples as mentioned above. Examples of the alkali used for the hydrolysis include, for example, alkali metal hydroxides such as sodium hydroxide and potassium hydroxide, and ammonia. The alkali is not limited to those mentioned above, either.

The method for producing polyester according to the invention comprises subjecting a dicarboxylic acid or an ester-forming derivative thereof and a glycol to polycondensation by an esterification reaction or a transesterification reaction in the presence of the above-described polycondensation catalyst.

In the production of polyester according to the invention, the dicarboxylic acid usable includes aliphatic dicarboxylic acids such as succinic acid, glutaric acid, adipic acid and dodecanedicarboxylic acid and the like, ester-forming derivatives thereof such as dialkyl esters, aromatic dicarboxylic acids such as terephthalic acid, isophthalic acid, naphthalenedicarboxylic acid and the like, and ester-forming derivatives thereof, for example, dialkyl esters.

Examples of the usable glycol include ethylene glycol, propylene glycol, diethylene glycol, triethylene glycol, butylene glycol, and 1,4-cyclohexanedimethanol.

Among the above, for example, the aromatic dicarboxylic acids such as terephthalic acid, isophthalic acid and naphthalenedicarboxylic acid are preferably used, and the glycols such as ethylene glycol, propylene glycol, butylene glycol, and 1,4-cyclohexanedimethanol are preferably used.

Therefore, some specific examples of preferred polyesters include polyethylene terephthalate, polybutylene terephthalate, polypropylene terephthalate, polyethylene naphthalate, polybutylene naphthalate, polypropylene naphthalate, and poly(1,4-cyclohexanedimethylene terephthalate).

The dicarboxylic acids or ester-forming derivatives thereof, and the glycols or ester-forming derivatives thereof usable in the invention are not limited to the above mentioned examples, and the obtained polyesters are not limited to the above mentioned examples, either. However, among the above examples, an aromatic dicarboxylic acid is preferable as the dicarboxylic acid, and a polyethylene terephthalate using terephthalic acid as the aromatic dicarboxylic acid and ethylene glycol as the glycol is preferable as the polyester.

Conventionally the polyethylene terephthalate has been produced usually by the following methods. A first method comprises producing low molecular weight oligomers containing the aforementioned BHET by a direct esterification of a dicarboxylic acid represented by terephthalic acid with a glycol represented by ethylene glycol, and subjecting the oligomers to melt-polycondensation in the presence of a polycondensation catalyst under a high vacuum and at a high temperature to yield polyester with a desired molecular weight.

A second method comprises preparing, like the first method, low molecular weight oligomers containing the aforementioned BHET by a transesterification reaction of a dialkyl terephthalate represented by dimethyl terephthalate and a glycol represented by ethylene glycol, and subjecting the oligomers to melt-polycondensation in the presence of a polycondensation catalyst under a high vacuum and at a high temperature to yield polyester with a desired molecular weight.

More specifically, the low molecular weight oligomers are transferred to a polycondensation reactor and are heated under reduced pressure to a temperature higher than the melting point of polyethylene terephthalate usually in the range of 240° C. to 280° C., that is, to a temperature of 280° C. to 290° C. so that the oligomers perform melt-polycondensation while unreacted ethylene glycol and ethylene glycol resulting from the reaction are distilled off from the reaction system under monitoring of the viscosity of the resulting melted products.

According to necessity, the polycondensation reaction may be performed by using a plurality of polycondensation reactors and changing the reaction temperature and pressure optimally in each of the polycondensation reactors. When the viscosity of the reaction mixture reaches a predetermined value, the reduction of pressure inside the polycondensation reactor is stopped and the pressure is returned to a normal pressure with nitrogen gas. Then, the resulting polyester is discharged from the polycondensation reactor, for example, in a form of strand, cooled rapidly with water, and cut to pellets. According to the invention, a polyester having an intrinsic viscosity (IV) usually of from 0.5 to 0.9 dL/g at a temperature of 30° C. is obtained in this way.

A polyester to be used for production of plastic bottles is required to have a molecular weight higher than that of a polyester used for fiber and film applications, for example. As already known, such a polyester having a higher molecular weight is obtained by solid-polycondensation of polyester obtained as melt-polycondensate.

Thus, the method for producing polyester of the invention uses the particles of water-insoluble or hardly water-soluble phosphate having a coating layer of titanic acid on the surfaces as a polycondensation catalyst in the conventional method for producing polyester.

A preferred method for producing polyester according to the invention comprises:

the first step of preparing low molecular weight oligomers containing a dicarboxylic acid diester by an esterification reaction or a transesterification reaction of a dicarboxylic acid or an ester-forming derivative thereof and a glycol, and the second step of subjecting the low molecular weight oligomers to melt-polycondensation to obtain polyester as melt-polycondensate, wherein at least the second step is performed in the presence of the water-insoluble or hardly water-soluble particles of phosphate having a coating layer of titanic acid on the surfaces. However, the first step may be performed in the presence of the polycondensation catalyst, and then the second step may be in succession performed in the presence of the polycondensation catalyst.

In the case of production of polyethylene terephtha late, at least the second step of subjecting the low molecular weight oligomers containing the bis(2-hydroxyethyl)terephthalate (BHET) to melt-polycondensation is performed in the presence of the polycondensation catalyst according to the invention, thereby to obtain polyester having a required molecular weight as melt polycondensate. However, the first step may be performed in the presence of the polycondensation catalyst, and then the second step may be in succession performed in the presence of the polycondensation catalyst.

The method of the invention may comprise a further step of subjecting the polyester obtained as melt-polycondensate to solid-polycondensation to obtain polyester as solid-polycondensate.

According to the method of the invention, usually the oligomer is subjected to melt-polycondensation in the presence of the polycondensation catalyst of the invention to obtain polyester as melt-polycondensate. Accordingly, when the polyester obtained as melt-polycondensate is further subjected to solid-polycondensation, it is not necessary to newly use the polycondensation catalyst when the solid-polycondensation thereof is performed because the polyester obtained as melt-polycondensate already contains the polycondensa lion catalyst. Under certain circumstances, however, the polycondensation catalyst of the invention may be newly added to the polyester obtained as melt-polycondensate when the solid-polycondensation is performed. For example, the polyester obtained by melt-polycondensate may be melt-mixed together with the polycondensation catalyst, and is then subjected to the solid-polycondensation.

More specifically, the solid-polycondensation of polyester is performed by drying melt-polycondensate polyester at a temperature of 100 to 200° C. under vacuum or under a flow of an inert gas or carbon dioxide gas, and after crystallizing the polyester at a temperature of 150 to 200° C., it is heated to a temperature lower than the melting point of the polyester, typically, at a temperature of about 200 to 230° C. thereby performing solid-polycondensation of the polyester. According to the invention, usually a polyester having an intrinsic viscosity (IV) in the range of 0.7 to 1.2 dUg at a temperature of 30° C. is thus obtained as solid-polycondensate.

The polycondensation catalyst may be added as it is to the reaction system. However, according to the invention, it is preferred that the polycondensation catalyst is added to the reaction system in the state of dispersion in a glycol used as one of the raw materials.

It is particularly preferred that the oligomer is subjected to melt-polycondensation in such a manner as described below. As the polycondensation catalyst is easily dispersed in a glycol, particularly in ethylene glycol, the polycondensation catalyst is in advance dispersed in ethylene glycol to obtain a slurry. The oligomer is put into a polycondensation reactor and is heated and melted, and the slurry is added thereto to perform the melt-polycondensation of the oligomer.

The polycondensation catalyst according to the invention is used in an amount usually in the range of 1 to 40 ppm in terms of titanium atom with respect to the polyester to he obtained on a weight basis. From the viewpoint of obtaining a polyester superior in color tone, the polycondensation catalyst is used in an amount in the range of 2 to 20 ppm, preferably in the range of 2-10 ppm, in terms of titanium atom on a weight basis with respect to the polyester to be obtained. When the amount of the polycondensation catalyst, used is less than 1 ppm with respect to the weight of polyester to be obtained by the polycondensation, the catalyst activity is insufficient depending on the amount of the catalyst used, and it is unlikely that the polyester having a desired high molecular weight is obtained. On the other hand, when the amount is more than 40 ppm with respect to the weight of polyester to be obtained, it is likely that the resulting polyester is inferior in heat stability.

The polycondensation catalyst according to the invention has catalytic activity not only in melt-polycondensation but also in solid-polycondensation and solution-polycondensation, and in any case, it can be used for the production of polyester.

As the polycondensation catalyst of the invention contains no antimony as an ingredient, it does not make the obtained polyester darkened, or it does not get mixed as a foreign substance with the obtained polyester, and yet it has catalyst activity equal to or higher than the catalysts containing antimony as an ingredient, and provides polyesters superior in color tone. Moreover, the polycondensation catalyst of the invention is non-toxic and hence safe.

In the production of polyester according to the invention, a conventionally known polycondensation catalyst, containing a compound of antimony, germanium, cobalt, zinc, manganese, titanium, tin, or aluminum may be used together with the polycondensation catalyst, of the invention so far as the advantages of the polycondensation catalyst is not impaired. In order to improve the color tone of the obtained polyester, an alkali metal compound may be used in combination, if necessary. A phosphorus-containing stabilizer may be used together to further improve the color tone as well as the heat stability of the obtained polyester, a phosphorus-containing stabilizer may he used together.

Examples of the phosphorus-containing stabilizer include phosphoric acid, a phosphate, a phosphoric acid ester such as trimethyl phosphate, triethyl phosphate or tri-n-butyl phosphate, phosphorous acid, a phosphite, a phosphorous acid ester such as triphenyl phosphite, and polyphosphoric acid. Such a phosphorus-containing stabilizer may be introduced into the reaction system at any time during the production of polyester. The phosphorus-containing stabilizer is used usually in an amount in the range of 1 to 100 ppm, preferably 3 to 20 ppm, in terms of phosphorus atom, based on the weight of the polyester to be obtained.

However, it is to be noted that the particles of the phosphate per se on the surfaces of which the coating layer of titanic acid is to be formed do not improve the color tone of the obtained polyester, or they have no effect as a stabilizer for improving heat stability, even if they are used in combination with the polycondensation catalyst of the invention.

In the production of polyester by esterification or transesterification of a dicarboxylic acid or its ester-forming derivative and a glycol, since the polycondensation catalyst of the invention comprises particles of phosphate as a support such as calcium pyrophosphate or magnesium phosphate containing a phosphorus component, and a coating layer formed of titanic acid on the surfaces thereof, it is believed that the phosphorus component of the particles of phosphate moderately suppresses the acid catalysis of titanic acid, resulting in providing a high molecular weight polyester superior in color tone.

Further, the polyester obtained using the polycondensation catalyst according to the invention contains the particles of phosphate having a coating layer of titanic acid on the surfaces in an amount of 1 to 40 ppm, preferably 2 to 20 ppm, most preferably 2 to 10 ppm, in terms of titanium atom based on the weight of the obtained polyester.

Therefore, the polyester obtained by using the polycondensation catalyst according to the invention has a feature that when the polyester is heated the crystallization temperature is higher than the polyester obtained by using antimony trioxide as a polycondensation catalyst. Thus, the polyester obtained by using the polycondensation catalyst. of the invention has a smaller crystallization rate, and accordingly, it maintains the transparency as a resin for a longer period when it is molded, for example, to manufacture bottles or fibers, than the polyester obtained by using antimony trioxide as a polycondensation catalyst.

EXAMPLES

The invention will be described with reference to examples, but the invention is not limited to these examples.

In the following Examples and Comparative Examples, ppm is based on weight. The intrinsic viscosity of the obtained polyester was measured using an automatic intrinsic viscosity measuring device SS-600-L1 manufactured by Shibayama Scientific Co., Ltd. The color tone of the obtained polyester was measured with a simultaneous measuring method spectrophotometer SQ-2000 manufactured by Nippon Denshoku Industries Co., Ltd.

The crystallization temperature of the obtained solid-polycondensate polyester when heated was measured using a high sensitivity differential scanning calorimeter (Thermo plus EVO II DSC8230 SmartLoader manufactured by Rigaku Corporation). The polyester obtained was set in a pan for measurement, and the temperature was raised to 270° C. at a rate of 10° C./min in a nitrogen atmosphere. After maintaining the temperature for 10 minutes, the temperature was lowered to 25° C. at a rate of 10° C./min. The temperature of the peak top of the exothermic peak of the polyester when heated was regarded as the crystallization temperature.

In the present invention, in order to evaluate the color tone of the obtained polyester, the L*a*b* color coordinate system defined by the International Commission on Illumination (CIE) in 1974 was adopted. In the L*a*b* color coordinate system, the L* value represents lightness, and the a* and b* values represent chromaticity, that is, hue and saturation. The larger the L* value of a color, the brighter the color, and the smaller the L* value of a color, the darker the color. The L* value for white is 100 and the L* value for black is 0. When the a* value of a color is a negative value, the color is green, and when it is a positive value, the color is red. When a color has a negative b* value, the color is blue, and has a positive b* value, the color is yellow.

Example 1

(Preparation of Polycondensation Catalyst A)

0.002 L of an aqueous solution of titanium tetrachloride (50.0 g/L in terms of $TiO_2$) and 0.002 L of an aqueous solution of sodium hydroxide (87.2 g /L in terms of NaOH) were prepared. Commercially available calcium pyrophosphate was dispersed in water to prepare 1 L of water dispersion (100 g/L). The water dispersion was put to a 5 L capacitor reactor. The aqueous solution of titanium tetrachloride and the aqueous solution of sodium hydroxide were simultaneously added dropwise to the water dispersion containing the calcium pyrophosphate over a period of 0.003 hours so that the resulting mixture had a pH of 7.0.

After completion of the dropwise addition, the mixture was aged for 1 hour to form a coating layer of titanic acid on the surfaces of the particles of the calcium pyrophosphate. The water slurry containing the particles of calcium pyrophosphate having the coating layer formed of titanic acid on the surface thus obtained was filtered, and the resulting product was washed with water and dried to obtain a solid, which was then disintegrated to provide a polycondensation catalyst A according to the invention. The polycondensation catalyst had 0.1 parts by weight of coating layer formed of titanic acid in terms of $TiO_2$ relative to 100 parts by weight of the calcium pyrophosphate.

(Production of Polyester a-1)

433 g of commercially available terephthalic acid and 191 g of ethylene glycol were placed in a polycondensation reactor and stirred under a nitrogen gas atmosphere to form a slurry, while the polycondensation catalyst A was dispersed in ethylene glycol to make a slurry. The slurry containing the polycondensation catalyst was added to the polycondensation reactor so that the polycondensation catalyst was present therein in an amount of 6.5 ppm in terms of titanium atom with respect to the polyester to be produced in the polycondensation reactor. An esterification reaction was carried out for 3.5 hours while the temperature inside the polycondensation reactor was maintained at 260° C. with gradually lowering the pressure inside the polycondensation reactor from 2.5 $kgf/cm^2$ to normal pressure using nitrogen gas.

After the completion of the esterification reaction, the temperature inside the polycondensation reactor was raised from 260° C. to 280° C. over a period of 1 hour while the pressure was reduced from normal pressure to 1 mmHg. Thereafter, a melt-polycondensation reaction was performed at the temperature under the pressure. When the torque of the stirrer provided with the polycondensation reactor reached a predetermined value, the melt-polycondensation reaction was terminated, the inside of the polycondensation reactor was returned to normal pressure with a nitrogen gas, and the obtained polyester was discharged in a strand form from the outlet at the bottom of the polycondensation reactor, cooled and cut to obtain pellets of the polyester. Table 1 shows the intrinsic viscosity and color tone of the melt-polycondensate polyester a-1 thus obtained.

(Production of Polyester a-2)

20 g of pellets of polyester a-1 was placed in a solid-polycondensation reaction tube, and dried for 4 hours while maintaining the temperature inside the reaction tube at 160° C. under a flow of nitrogen gas. The temperature inside the reaction tube was further raised to and maintained at 190° C. thereby the polyester was crystallized for 1 hour.

Thereafter, the temperature in the reaction tube was raised to and maintained at 200° C. to perform solid-polycondensation reaction for 18 hours. After the completion of the polycondensation reaction, the resultant was cooled to obtain pellets of a solid-polycondensate polyester. Table 1 shows the intrinsic viscosity and color tone of the solid-polycondensate polyester a-2 thus obtained.

Example 2

(Preparation of Polycondensation Catalyst B)

0.02 L of an aqueous solution of titanium tetrachloride (50.0 g/L in terms of $TiO_2$) and 0.02 L of an aqueous solution of sodium hydroxide (87.2 g/L in terms of NaOH) were prepared. 1 L of water slurry containing commercially available calcium pyrophosphate (100 g/L) was placed in a 5 L reactor. The aqueous solution of titanium tetrachloride and the aqueous solution of sodium hydroxide were simultaneously added dropwise to the water slurry containing the calcium pyrophosphate over 0.03 hours so that the resulting mixture had a pH of 7.0.

After the completion of the dropwise addition, the resulting mixture was aged for 1 hour to form a coating layer of titanic acid on the surfaces of the particles of calcium pyrophosphate. The water slurry containing the particles of calcium pyrophosphate having on the surfaces a coating layer formed of titanic acid thus obtained is filtered, and the resulting product was washed with water and dried to obtain a solid. The solid was disintegrated to obtain a polycondensation catalyst B. The polycondensation catalyst had 1 part by weight of coating layer formed of titanic acid in terms of $TiO_2$ relative to 100 parts by weight of calcium pyrophosphate.

(Production of Polyester b-1)

A polyester was obtained in the same manner as in Example 1 except that the polycondensation catalyst B was used. Table 1 shows the intrinsic viscosity and color tone of the thus obtained melt-polycondensate polyester b-1.

(Production of Polyester b-2)

A polyester was obtained in the same manner as in Example 1 except that polyester b-1 was used. Table 1 shows the intrinsic viscosity, color tone, and the crystallization temperature of the solid-polycondensate polyester b-2 thus obtained.

Example 3

(Preparation of Polycondensation Catalyst C)

0.2 L of an aqueous solution of titanium tetrachloride (50.0 g/L in terms of $TiO_2$) and 0.2 L of an aqueous solution of sodium hydroxide (87.2 g/L in terms of NaOH) were prepared. 1 L of water slurry containing commercially available calcium pyrophosphate (100 g/L) was placed in a 5 L reactor. The aqueous solution of titanium tetrachloride and the aqueous solution of sodium hydroxide were simultaneously added dropwise to the water slurry containing the calcium pyrophosphate over 0.3 hours so that the resulting mixture had a pH of 7.0.

After the completion of the dropwise addition, the resulting mixture was aged for 1 hour to form a coating layer of titanic acid on the surfaces of the particles of calcium pyrophosphate. The water slurry containing the particles of calcium pyrophosphate having on the surfaces a coating layer formed of titanic acid thus obtained is filtered, and the resulting product was washed with water and dried to obtain a solid. The solid was disintegrated to obtain a polycondensation catalyst C. The polycondensation catalyst had 10 parts by weight of coating layer formed of titanic acid in terms of $TiO_2$ relative to 100 parts by weight of calcium pyrophosphate.

(Production of Polyester c-1)

A polyester was obtained in the same manner as in Example 1 except that the polycondensation catalyst C was used. Table 1 shows the intrinsic viscosity and color tone of the thus obtained melt-polycondensate polyester c-1.

(Production of Polyester c-2)

A polyester was obtained in the same manner as in Example 1 except that polyester c-1 was used. Table 1 shows the intrinsic viscosity and color tone of the solid-polycondensate polyester c-2 thus obtained.

Example 4

(Preparation of Polycondensation Catalyst D)

0.4 L of an aqueous solution of titanium tetrachloride (50.0 g/L in terms of $TiO_2$) and 0.4 L of an aqueous solution of sodium hydroxide (87.2 g/L in terms of NaOH) were prepared. 1 L of a water slurry containing a commercially available calcium pyrophosphate (100 g/L) was placed in a 5 L reactor. The aqueous solution of titanium tetrachloride and the aqueous solution of sodium hydroxide were simultaneously added dropwise to the water slurry containing the calcium pyrophosphate over 0.51 hours so that the resulting mixture had a pH of 7.0.

After the completion of the dropwise addition, the resulting mixture was aged for 1 hour to form a coating layer of titanic acid on the surfaces of the particles of calcium pyrophosphate. The water slurry containing the particles of calcium pyrophosphate having on the surfaces a coating layer formed of titanic acid thus obtained is filtered, and the resulting product was washed with water and dried to obtain a solid. The solid was disintegrated to obtain a polycondensation catalyst D. The polycondensation catalyst had 20 parts by weight of coating layer formed of titanic acid in terms of $TiO_2$ relative to 100 parts by weight of calcium pyrophosphate.

(Production of Polyester d-1)

A polyester was obtained in the same manner as in Example 1 except that the polycondensation catalyst D was used. Table 1 shows the intrinsic viscosity and color tone of the thus obtained melt-polycondensate polyester d-1.

(Production of Polyester d-2)

A polyester was obtained in the same manner as in Example 1 except that polyester d-1 was used. Table 1 shows the intrinsic viscosity, color tone, and the crystallization temperature of the solid-polycondensate polyester d-2 thus obtained.

Example 5

(Preparation of Polycondensation Catalyst E)

1 L of an aqueous solution of titanium tetrachloride (50.0 g/L in terms of $TiO_2$) and 1 L of an aqueous solution of sodium hydroxide (87.2 g/L in terms of NaOH) were prepared. 1 L of a water slurry containing a commercially available calcium pyrophosphate (100 g/L) was placed in a 5 L reactor. The aqueous solution of titanium tetrachloride and the aqueous sodium hydroxide solution were simultaneously added dropwise to the water slurry containing the calcium pyrophosphate over a period of 1.28 hours so that the resulting mixture had a pH of 7.0.

After the completion of the dropwise addition, the resulting mixture was aged for 1 hour to form a coating layer of titanic acid on the surfaces of the particles of calcium pyrophosphate. The water slurry containing the particles of calcium pyrophosphate having on the surfaces a coating layer formed of titanic acid thus obtained is filtered, and the resulting product was washed with water and dried to obtain a solid. The solid was disintegrated to obtain a polycondensation catalyst E. The polycondensation catalyst had 50 parts by weight of coating layer formed of titanic acid in terms of $TiO_2$ relative to 100 parts by weight of calcium pyrophosphate.

(Production of Polyester e-1)

A polyester was obtained in the same manner as in Example 1 except that the polycondensation catalyst E was used. Table 1 shows the intrinsic viscosity and color tone of the melt-polycondensate polyester e-1 thus obtained.

(Production of Polyester e-2)

A polyester was obtained in the same manner as in Example 1 except that polyester e-1 was used. Table 1 shows the intrinsic viscosity, color tone, and the crystallization temperature of the solid-polycondensate polyester e-2 thus obtained.

Example 6

(Preparation of Polycondensation Catalyst F)

2 L of an aqueous solution of titanium tetrachloride (50.0 g/L in terms of $TiO_2$) and 2 L of an aqueous solution of sodium hydroxide (87.2 g/L in terms of NaOH) were prepared. 1 L of water slurry containing a commercially available calcium pyrophosphate (100 g/L) was placed in a 10 L reactor. The aqueous solution of titanium tetrachloride and the aqueous solution of sodium hydroxide were simultaneously added dropwise to the water slurry containing the calcium pyrophosphate over 2.56 hours so that the resulting mixture had a pH of 7.0.

After the completion of the dropwise addition, the resulting mixture was aged for 1 hour to form a coating layer of titanic acid on the surfaces of the particles of calcium pyrophosphate. The water slurry containing the particles of calcium pyrophosphate having on the surfaces a coating layer formed of titanic acid thus obtained is filtered, and the resulting product was washed with water and dried to obtain a solid. The solid was disintegrated to obtain a polycondensation catalyst F. The polycondensation catalyst had 100 parts by weight of coating layer formed of titanic acid in terms of $TiO_2$ relative to 100 parts by weight of calcium pyrophosphate.

(Production of Polyester f-1)

A polyester was obtained in the same manner as in Example 1 except that the polycondensation catalyst F was used. Table 1 shows the intrinsic viscosity and color tone of the thus obtained melt-polycondensate polyester f-1.

(Production of Polyester f-2)

A polyester was obtained in the same manner as in Example 1 except that polyester f-1 was used. Table 1 shows the intrinsic viscosity and color tone of the solid-polycondensate polyester f-2 thus obtained.

Example 7

(Production of Polyester g-1)

433 g of commercially available terephthalic acid and 191 g of ethylene glycol were placed in a polycondensation reactor and stirred under a nitrogen gas atmosphere to form a slurry, while the polycondensation catalyst E was dispersed in ethylene glycol to prepare a slurry. The slurry containing the polycondensation catalyst was added to the polycondensation reactor so that the polycondensation catalyst was present therein in an amount of 2 ppm in terms of titanium atom with respect to the polyester produced in the polycondensation reactor. An esterification reaction was performed for 3.5 hours while the temperature inside the polycondensation reactor was maintained at 260° C. with gradually lowering the pressure inside the polycondensation reactor from 2.5 kgf/cm$^2$ to normal pressure using a nitrogen gas.

After the completion of the esterification reaction, the temperature inside the polycondensation reactor was raised from 260° C. to 280° C. over a period of 1 hour while the pressure inside the polycondensation reactor was reduced from normal pressure to 1 mmHg. Thereafter, a polycondensation reaction was performed at the temperature and under the pressure. When the torque of the stirrer reached a predetermined value, the polycondensation reaction was terminated, and the pressure inside the polycondensation reactor was returned to normal pressure using a nitrogen gas. Then the obtained polyester was discharged in a strand form from the outlet at the bottom of the polycondensation reactor, cooled and cut to obtain pellets of the polyester. Table 1 shows the intrinsic viscosity and color tone of the thus obtained melt-polycondensate polyester g-1.

(Production of Polyester g-2)

A polyester was obtained in the same manner as in Example 1 except that polyester g-1 was used. Table 1 shows the intrinsic viscosity, color tone, and the crystallization temperature of the solid-polycondensate polyester g-2 thus obtained.

Example 8

(Production of Polyester h-1)

433 g of commercially available terephthalic acid and 191 g of ethylene glycol were placed in a polycondensation reactor, and stirred under a nitrogen gas atmosphere to form a slurry, while the polycondensation catalyst was dispersed in ethylene glycol to prepare a slurry. The slurry containing the polycondensation catalyst was added to the polycondensation reactor so that the polycondensation catalyst was present in the polycondensation reactor in an amount of 10 ppm in terms of titanium atom with respect to the polyester to be produced. An esterification reaction was performed for 3.5 hours while the temperature inside the polycondensation reactor was maintained at 260° C. with gradually lowering the pressure inside the polycondensation reactor from 2.5 kgf/cm$^2$ to normal pressure using a nitrogen gas.

After the completion of the esterification reaction, the temperature inside the polycondensation reactor was raised from 260° C. to 280° C. while the pressure inside the polycondensation reactor was reduced from normal pressure to 1 mmHg over a period of 1 hour. Thereafter, a melt-polycondensation reaction was performed at the temperature and under the pressure. When the torque of the stirrer reached a predetermined value, the melt-polycondensation reaction was terminated, the inside of the polycondensation reactor was returned to normal pressure using a nitrogen gas. The obtained polyester was discharged in a strand form from the outlet at the bottom of the polycondensation reactor, cooled and cut to obtain pellets of the polyester. Table 1 shows the intrinsic viscosity and color tone of the melt polycondensate polyester h-1 thus obtained.
(Production of Polyester h-2)

A polyester was obtained in the same manner as in Example 1 except that polyester h-1 was used. Table 1 shows the intrinsic viscosity and color tone of the solid-polycondensate polyester h-2 thus obtained.

Example 9

(Production of Polyester i-1)

433 g of commercially available terephthalic acid and 191 g of ethylene glycol were placed in a polycondensation reactor, and stirred under a nitrogen gas atmosphere to form a slurry, while the polycondensation catalyst E was dispersed in ethylene glycol to prepare a slurry. The slurry containing the polycondensation catalyst was added to the polycondensation reactor so that the polycondensation catalyst was present in the polycondensation reactor in an amount of 20 ppm in terms of titanium atom with respect to the polyester to be produced in the polycondensation reactor. An esterification reaction was performed for 3.5 hours while the temperature inside the polycondensation reactor was maintained at 260° C. with gradually lowering the pressure inside the polycondensation reactor from 2.5 kgf/cm$^2$ to normal pressure using a nitrogen gas.

After the completion of the esterification reaction, the temperature inside the polycondensation reactor was raised from 260° C. to 280° C. while the pressure inside the polycondensation reactor was reduced from normal pressure to 1 mmHg over a period of 1 hour. Thereafter, a melt-polycondensation reaction was performed at the temperature and under the pressure. When the torque of the stirrer reached a predetermined value, the melt-polycondensation reaction was terminated, the inside of the polycondensation reactor was returned to normal pressure using a nitrogen gas. The obtained polyester was discharged in a strand form from the outlet at the bottom of the polycondensation reactor, cooled and cut to obtain pellets of the polyester. Table 1 shows the intrinsic viscosity and color tone of the melt polycondensate polyester i-1 thus obtained.
(Production of Polyester i-2)

A polyester was obtained in the same manner as in Example 1 except that polyester i-1 was used. Table 1 shows the intrinsic viscosity, color tone, and the crystallization temperature of the solid-polycondensate polyester i-2 thus obtained.

Example 10

(Production of Polyester j-1)

433 g of commercially available terephthalic acid and 191 g of ethylene glycol were placed in a polycondensation reactor, and stirred under a nitrogen gas atmosphere to form a slurry, while the polycondensation catalyst E was dispersed in ethylene glycol to prepare a slurry. The slurry containing the polycondensation catalyst was added to the polycondensation reactor so that the polycondensation catalyst, was present therein in an amount of 6.5 ppm in terms of titanium atom with respect to the polyester to be produced in the polycondensation catalyst. An esterification reaction was performed for 3.5 hours while the temperature inside the polycondensation reactor was maintained at 260° C. with gradually lowering the pressure inside the polycondensation reactor from 2.5 kgf/cm$^2$ to normal pressure using a nitrogen gas.

A commercially available phosphoric acid having a concentration of 85% by weight, was diluted with ethylene glycol to prepare an ethylene glycol solution of phosphoric acid. After the completion of the esterification reaction, the ethylene glycol solution of phosphoric acid was added to the polycondensation reactor in an amount of 5 ppm in terms of phosphorus atom with respect to the weight, of polyester to be obtained.

5 minutes after the addition of the ethylene glycol solution of phosphoric acid, the temperature inside the polycondensation reactor was raised from 260° C. to 280° C. and the pressure inside the polycondensation reactor was reduced from normal pressure to 1 mmHg over a period of 1 hour. Thereafter, a melt-polycondensation reaction was performed at the temperature under the pressure. When the torque of the stirrer reached a predetermined value, the melt-polycondensation reaction was terminated, the inside of the polycondensation reactor was returned to normal pressure using a nitrogen gas. The obtained polyester was discharged in a strand form from the outlet at the bottom of the polycondensation reactor, cooled and cut to obtain pellets of the polyester. Table 1 shows the intrinsic viscosity and color tone of the thus obtained melt-polycondensate polyester j-1.
(Production of Polyester j-2)

A polyester was obtained in the same manner as in Example 1 except that polyester j-1 was used. Table 1 shows the intrinsic viscosity and color tone of the solid-polycondensate polyester j-2 thus obtained.

Example 11

(Production of Polyester k-1)

433 g of commercially available terephthalic acid and 191 g of ethylene glycol were placed in a polycondensation polycondensation reactor, and stirred under a nitrogen gas atmosphere to form a slurry, while the polycondensation catalyst. E was dispersed in ethylene glycol to prepare a slurry. The slurry containing the polycondensation catalyst was added to the polycondensation reactor so that the polycondensation catalyst was present in the polycondensation reactor in an amount of 6.5 ppm in terms of titanium atom with respect to the polyester produced. An esterification reaction was performed for 3.5 hours while the temperature inside the polycondensation reactor was maintained at 260° C. with gradually lowering the pressure inside the polycondensation reactor from 2.5 kgf/cm$^2$ to normal pressure using a nitrogen gas.

A commercially available trimethyl phosphate was diluted with ethylene glycol to prepare an ethylene glycol solution of trimethyl phosphate. After the completion of the esterification reaction, the ethylene glycol solution of trimethyl phosphate was added to the polycondensation reactor in an amount of 5 ppm in terms of phosphorus atom with respect to the weight of polyester to be obtained.

5 minutes after the addition of the ethylene glycol solution of trimethyl phosphate, the temperature inside the polycondensation reactor was raised from 260° C. to 280° C. and the pressure inside the polycondensation reactor was reduced from normal pressure to 1 mmHg over a period of 1 hour. Thereafter, a melt-polycondensation reaction was performed at the temperature under the pressure. When the torque of the stirrer reached a predetermined value, the melt-polycondensation reaction was terminated, the inside of the polycondensation reactor was returned to normal pressure using a nitrogen gas. The obtained polyester was discharged in a strand form from the outlet at the bottom of the polycondensation reactor, cooled and cut to obtain pellets of the polyester. Table 1 shows the intrinsic viscosity and color tone of the thus obtained melt-polycondensate polyester k-1.
(Production of Polyester k-2)

A polyester was obtained in the same manner as in Example 1 except that polyester k-1 was used. Table 1 shows the intrinsic viscosity and color tone of the solid-polycondensate polyester k-2 thus obtained.

Example 12

(Preparation of Polycondensation Catalyst G)

1 L of an aqueous solution of titanium tetrachloride (50.0 g/L in terms of $TiO_2$) and 1 L of an aqueous solution of sodium hydroxide (87.2 g/L in terms of NaOH) were prepared. 1 L of a water slurry containing commercially available calcium dihydrogenpyrophosphate (100 g/L) was placed in a 5 L reactor. The aqueous solution of titanium tetrachloride and the aqueous solution of sodium hydroxide were simultaneously added dropwise to the water slurry containing the calcium dihydrogen-pyrophosphate over a period of 1.28 hours so that the resulting mixture had a pH of 7.7.

After the completion of the dropwise addition, the resulting mixture was aged for 1 hour to form a coating layer of titanic acid on the surfaces of the particles of calcium dihydrogenpyrophosphate. The water slurry containing the particles of calcium dihydrogenpyrophosphate having on the surfaces a coating layer formed of titanic acid thus obtained is filtered, and the resulting product, was washed with water and dried to obtain a solid. The solid was disintegrated to obtain a polycondensation catalyst G. The polycondensation catalyst had 50 parts by weight of coating layer formed of titanic acid in terms of $TiO_2$ relative to 100 parts by weight of calcium dihydrogenpyrophosphate.
(Production of Polyester 1-1)

A polyester was obtained in the same manner as in Example 1 except that the polycondensation catalyst G was used. Table 1 shows the intrinsic viscosity and color tone of the thus obtained melt-polycondensate polyester 1-1.
(Production of Polyester 1-2)

A polyester was obtained in the same manner as in Example 1, except that polyester 1-1 was used. Table 1 shows the intrinsic viscosity, color tone, and the crystallization temperature of the solid-polycondensate polyester 1-2 thus obtained.

Example 13

(Preparation of Polycondensation Catalyst H)

1 L of an aqueous solution of titanium tetrachloride (50.0 g/L in terms of $TiO_2$) and 1 L of an aqueous solution of sodium hydroxide (87.2 g/L in terms of NaOH) were prepared. 1 L of a water slurry containing commercially available tribasic calcium phosphate (100 g/L) was placed in a 5 L reactor. The aqueous solution of titanium tetrachloride and the aqueous solution of sodium hydroxide were simultaneously added dropwise to the water slurry containing the tribasic calcium phosphate over a period of 1.28 hours so that the resulting mixture had a pH of 7.0.

After the completion of the dropwise addition, the resulting mixture was aged for 1 hour to form a coating layer of titanic acid on the surfaces of the particles of tribasic calcium phosphate. The water slurry containing the particles of tribasic calcium phosphate having on the surfaces a coating layer formed of titanic acid thus obtained is filtered, and the resulting product was washed with water and dried to obtain a solid. The solid was disintegrated to obtain a polycondensation catalyst H. The polycondensation catalyst had 50 parts by weight of coating layer formed of titanic acid in terms of $TiO_2$ relative to 100 parts by weight of tribasic calcium phosphate.
(Production of Polyester m-1)

A polyester was obtained in the same manner as in Example 1 except that the polycondensation catalyst H was used. Table 2 shows the intrinsic viscosity and color tone of the thus obtained melt-polycondensate polyester m-1.
(Production of Polyester m-2)

A polyester was obtained in the same manner as in Example 1 except that polyester m-1 was used. Table 2 shows the intrinsic viscosity, color tone, and the crystallization temperature of the solid-polycondensate polyester m-2 thus obtained.

Example 14

(Preparation of Polycondensation Catalyst 1) 1 L of an aqueous solution of titanium tetrachloride (50.0 g/L in terms of $TiO_2$) and 1 L of an aqueous solution of sodium hydroxide (87.2 g/L in terms of MOW were prepared. 1 L of a water slurry containing commercially available dibasic calcium phosphate (100 g/L) was placed in a 5 L reactor. The aqueous solution of titanium tetrachloride and the aqueous solution of sodium hydroxide were simultaneously added dropwise to the water slurry containing the dibasic calcium phosphate over a period of 1.28 hours so that the resulting mixture had a pH of 7.0.

After the completion of the dropwise addition, the resulting mixture was aged for 1 hour to form a coating layer of titanic acid on the surfaces of the particles of dibasic calcium phosphate. The water slurry containing the particles of dibasic calcium phosphate having on the surfaces a coating layer formed of titanic acid thus obtained is filtered, and the resulting product was washed with water and dried to obtain a solid. The solid was disintegrated to obtain a polycondensation catalyst I. The polycondensation catalyst had 50 parts by weight of coating layer formed of titanic acid in terms of $TiO_2$ relative to 100 parts by weight of dibasic calcium phosphate.
(Production of Polyester n-1)

A polyester was obtained in the same manner as in Example 1 except that the polycondensation catalyst I was used. Table 2 shows the intrinsic viscosity and color tone of the thus obtained melt-polycondensate polyester n-1.
(Production of Polyester n-2)

A polyester was obtained in the same manner as in Example 1 except that polyester n-1 was used. Table 2 shows the intrinsic viscosity, color tone, and the crystallization temperature of the solid-polycondensate polyester n-2 thus obtained.

Example 15

(Preparation of Polycondensation Catalyst J)

1 L of an aqueous solution of titanium tetrachloride (50.0 g/L in terms of $TiO_2$) and 1 L of an aqueous solution of sodium hydroxide (87.2 g/L in terms of NaOH) were prepared. 1 L of a water slurry containing commercially available magnesium pyrophosphate (100 g/L) was placed in a 5 L reactor. The aqueous solution of titanium tetrachloride and the aqueous solution of sodium hydroxide were simultaneously added dropwise to the water slurry containing the magnesium pyrophosphate over a period of 1.28 hours so that the resulting mixture had a pH of 7.0.

After the completion of the dropwise addition, the resulting mixture was aged for 1 hour to form a coating layer of titanic acid on the surfaces of the particles of magnesium pyrophosphate. The water slurry containing the particles of magnesium pyrophosphate having on the surfaces a coating layer formed of titanic acid thus obtained is filtered, and the resulting product was washed with water and dried to obtain a solid. The solid was disintegrated to obtain a polycondensation catalyst J. The polycondensation catalyst had 50 parts by weight of coating layer formed of titanic acid in terms of $TiO_2$ relative to 100 parts by weight of magnesium pyrophosphate.

(Production of Polyester o-1)

A polyester was obtained in the same manner as in Example 1 except that the polycondensation catalyst J was used. Table 2 shows the intrinsic viscosity and color tone of the thus obtained melt-polycondensate polyester o-1.

(Production of Polyester o-2)

A polyester was obtained in the same manner as in Example 1 except that polyester o-1 was used. Table 2 shows the intrinsic viscosity, color tone, and the crystallization temperature of the solid-polycondensate polyester o-2 thus obtained.

Example 16

(Preparation of Polycondensation Catalyst K)

0.4 L of an aqueous solution of titanium tetrachloride (50.0 g/L in terms of $TiO_2$) and 0.4 L of an aqueous solution of sodium hydroxide (87.2 g/L in terms of NaOH) were prepared. 1 h of a water slurry containing commercially available tribasic magnesium phosphate (100 g/L) was placed in a 5 L reactor. The aqueous solution of titanium tetrachloride and the aqueous solution of sodium hydroxide were simultaneously added dropwise to the water slurry containing the tribasic magnesium phosphate over a period of 0.51 hours so that the resulting mixture had a pH of 7.0.

After the completion of the dropwise addition, the resulting mixture was aged for 1 hour to form a coating layer of titanic acid on the surfaces of the particles of tribasic magnesium phosphate. The water slurry containing the particles of tribasic magnesium phosphate having on the surfaces a coating layer formed of titanic acid thus obtained is filtered, and the resulting product was washed with water and dried to obtain a solid. The solid was disintegrated to obtain a polycondensation catalyst K. The polycondensation catalyst had 20 parts by weight of coating layer formed of titanic acid in terms of $TiO_2$ relative to 100 parts by weight of tribasic magnesium phosphate.

(Production of Polyester p-1)

A polyester was obtained in the same manner as in Example 1 except that the polycondensation catalyst K was used. Table 2 shows the intrinsic viscosity and color tone of the thus obtained melt-polycondensate polyester p-1.

(Production of Polyester p-2)

A polyester was obtained in the same manner as in Example 1 except that polyester p-1 was used. Table 2 shows the intrinsic viscosity, color tone, and the crystallization temperature of the solid-polycondensate polyester p-2 thus obtained.

Example 17

(Preparation of Polycondensation Catalyst L)

1 L of an aqueous solution of titanium tetrachloride (50.0 g/L in terms of $TiO_2$) and 1 L of an aqueous solution of sodium hydroxide (87.2 g/L in terms of NaOH) were prepared. 1 L of a water slurry containing commercially available tribasic magnesium phosphate (100 g/L) was placed in a 5 L reactor. The aqueous solution of titanium tetrachloride and the aqueous solution of sodium hydroxide were simultaneously added dropwise to the water slurry containing the tribasic magnesium phosphate over a period of 1.28 hours so that the resulting mixture had a pH of 7.0.

After the completion of the dropwise addition, the resulting mixture was aged for 1 hour to form a coating layer of titanic acid on the surfaces of the particles of tribasic magnesium phosphate. The water slurry containing the particles of tribasic magnesium phosphate having on the surfaces a coating layer formed of titanic acid thus obtained is filtered, and the resulting product was washed with water and dried to obtain a solid. The solid was disintegrated to obtain a polycondensation catalyst L. The polycondensation catalyst had 50 parts by weight of coating layer formed of titanic acid in terms of $TiO_2$ relative to 100 parts by weight of tribasic magnesium phosphate.

(Production of Polyester q-1)

A polyester was obtained in the same manner as in Example 1 except that the polycondensation catalyst L was used. Table 2 shows the intrinsic viscosity and color tone of the thus obtained melt-polycondensate polyester q-1.

(Production of polyester q-2)

A polyester was obtained in the same manner as in Example 1 except that polyester q-1 was used. Table 2 shows the intrinsic viscosity, color tone, and the crystallization temperature of the solid-polycondensate polyester q-2 thus obtained.

Example 18

(Production of Polyester r-1)

A polyester was obtained in the same manner as in Example 7 except that the polycondensation catalyst L was used. Table 2 shows the intrinsic viscosity and color tone of the melt-polycondensate polyester r-1 thus obtained.

(Production of Polyester r-2)

A polyester was obtained in the same manner as in Example 1 except that polyester r-1 was used. Table 2 shows the intrinsic viscosity and color tone of the solid-polycondensate polyester r-2 thus obtained.

Example 19

(Production of Polyester s-1)

A polyester was obtained in the same manner as in Example 8 except. that the polycondensation catalyst L was used. Table 2 shows the intrinsic viscosity and color tone of the melt polycondensate polyester s-1 thus obtained.

(Production of Polyester s-2)

A polyester was obtained in the same manner as in Example 1 except that polyester s-1 was used. Table 2 shows the intrinsic viscosity and color tone of the solid-polycondensate polyester s-2 thus obtained.

Example 20

(Preparation of Polycondensation Catalyst M)

1 L of an aqueous solution of titanium tetrachloride (50.0 g/L in terms of $TiO_2$) and 1 L of an aqueous solution of sodium hydroxide (87.2 g/L in terms of NaOH) were prepared. 1 L of a water slurry containing commercially available magnesium metaphosphate (100 g/L) was placed in a 5 L reactor. The aqueous solution of titanium tetrachloride and the aqueous solution of sodium hydroxide were simultaneously added dropwise to the water slurry containing the magnesium metaphosphate over a period of 1.28 hours so that the resulting mixture had a pH of 7.0.

After the completion of the dropwise addition, the resulting mixture was aged for 1 hour to form a coating layer of titanic acid on the surfaces of the particles of magnesium metaphosphate. The water slurry containing the particles of magnesium metaphosphate having on the surfaces a coating layer formed of titanic acid thus obtained is filtered, and the resulting product, was washed with water and dried to obtain a solid. The solid was disintegrated to obtain a polycondensation catalyst M. The polycondensation catalyst had 50 parts by weight of coating layer formed of titanic acid in terms of $TiO_2$ relative to 100 parts by weight of magnesium metaphosphate.

(Production of Polyester t-1)

A polyester was obtained in the same manner as in Example 1 except that the polycondensation catalyst M was used. Table 2 shows the intrinsic viscosity and color tone of the thus obtained melt-polycondensate polyester t-1.

(Production of Polyester t-2)

A polyester was obtained in the same manner as in Example 1 except that polyester t-1 was used. Table 2 shows the intrinsic viscosity, color tone, and the crystallization temperature of the solid-polycondensate polyester t-2 thus obtained.

Comparative Example 1

(Preparation of Polycondensation Catalyst N)

1 L of an aqueous solution of titanium tetrachloride (50.0 g/L in terms of $TiO_2$) and 1 L of an aqueous solution of sodium hydroxide (87.2 g/L in terms of NaOH) were prepared. 1 L of a water slurry containing commercially available hydrotalcite (100 g/L) was placed in a 5 L reactor. The aqueous solution of titanium tetrachloride and the aqueous solution of sodium hydroxide were simultaneously added dropwise to the water slurry containing the hydrotalcite over a period of 1.28 hours so that the resulting mixture had a pH of 7.0.

After the completion of the dropwise addition, the resulting mixture was aged for 1 hour to form a coating layer of titanic acid on the surfaces of the particles of hydrotalcite. The water slurry containing the particles of hydrotalcite having on the surfaces a coating layer formed of titanic acid thus obtained is filtered, and the resulting product was washed with water and dried to obtain a solid. The solid was disintegrated to obtain a polycondensation catalyst N. The polycondensation catalyst had 50 parts by weight of coating layer formed of titanic acid in terms of $TiO_2$ relative to 100 parts by weight of hydrotalcite.

(Production of Polyester u-1)

A polyester was obtained in the same manner as in Example 1 except that the polycondensation catalyst N was used. Table 2 shows the intrinsic viscosity and color tone of the thus obtained melt-polycondensate polyester u-1.

(Production of Polyester u-2)

A polyester was obtained in the same manner as in Example 1 except that polyester u-1 was used. Table 2 shows the intrinsic viscosity, color tone, and the crystallization temperature of the solid-polycondensate polyester u-2 thus obtained.

Comparative Example 2

(Production of Polyester v-1)

A polyester was obtained in the same manner as in Example 10 except that the polycondensation catalyst N was used. Table 2 shows the intrinsic viscosity and color tone of the melt-polycondensate polyester v-1 thus obtained.

(Production of polyester v-2)

A polyester was obtained in the same manner as in Example 1, except that polyester v-1 was used. Table 2 shows the intrinsic viscosity and color tone of the solid-polycondensate polyester v-2 thus obtained.

Comparative Example 3

(Production of Polyester w-1)

433 g of commercially available terephthalic acid and 191 g of ethylene glycol were placed in a polycondensation reactor, and stirred under a nitrogen gas atmosphere to form a slurry, while the polycondensation catalyst N was dispersed in ethylene glycol to prepare a slurry. The slurry containing the polycondensation catalyst was added to the polycondensation reactor so that the polycondensation catalyst was present in the polycondensation reactor in an amount of 6.5 ppm in terms of titanium atom with respect to the polyester to be obtained in the polycondensation reactor.

Commercially available calcium pyrophosphate was dispersed in ethylene glycol to prepare a slurry. After the completion of the esterification reaction, the slurry containing the calcium pyrophosphate was added to the polycondensation reactor so that the calcium pyrophosphate was present in the polycondensation reactor in an amount of 5 ppm in terms of phosphorus atom with respect to the polyester to be produced in the polycondensation reactor.

5 minutes after the addition of the slurry containing the calcium pyrophosphate, the temperature inside the polycondensation reactor was raised from 260° C. to 280° C. and the pressure inside the polycondensation reactor was reduced from normal pressure to 1 mmHg over a period of 1 hour. Thereafter, a melt-polycondensation reaction was performed at the temperature under the pressure. When the torque of the stirrer reached a predetermined value, the melt-polycondensation reaction was terminated, the inside of the polycondensation reactor was returned to normal pressure using a nitrogen gas. The obtained polyester was discharged in a strand form from the outlet at the bottom of the polycondensation reactor, cooled and cut to obtain pellets of the polyester. Table 2 shows the intrinsic viscosity and color tone of the thus obtained melt-polycondensate polyester w-1.

(Production of Polyester w-2)

A polyester was obtained in the same manner as in Example 1 except that polyester w-1 was used. Table 2 shows the intrinsic viscosity and color tone of the solid-polycondensate polyester w-2 thus obtained.

Comparative Example 4

(Production of Polyester x-1)

A solution of antimony trioxide in ethylene glycol was prepared by heating antimony trioxide in ethylene glycol. A polyester was obtained in the same manner as in Example 1 except that the solution of antimony trioxide was added to the polycondensation reactor so that the antimony trioxide was present in the polycondensation reactor in an amount of 217 ppm in terms of antimony atom with respect to the polyester to be obtained in the polycondensation reactor. Table 2 shows the intrinsic viscosity and color tone of the thus obtained melt-polycondensate polyester x-1.

(Production of Polyester x-2)

A polyester was obtained in the same manner as in Example 1 except that polyester x-1 was used. Table 2 shows the intrinsic viscosity, color tone, and the crystallization temperature of the solid-polycondensate polyester x-2 thus obtained.

In Tables 1 and 2, the phosphate a is calcium pyrophosphate (insoluble), b is calcium dihydrogenpyrophosphate (1.80 g), c is tribasic calcium phosphate (0.0025 g), d is dibasic calcium phosphate (0.02 g), e is magnesium pyrophosphate (insoluble), f is tribasic magnesium phosphate (0.02 g), g is magnesium metaphosphate (insoluble), and h is hydrotalcite. When a phosphate is insoluble in water, it is mentioned that the phosphate is "insoluble" in parentheses, while a phosphate is hardly soluble in water, the solubility in water at 25° C. of the phosphate is mentioned in parentheses.

TABLE 1

| | Polycondensation Catalyst | | | | Melt-Polycondensate Polyester | | | | | |
|---|---|---|---|---|---|---|---|---|---|---|
| | | | Titanic Acid Coating (Parts by | Amount Used | | | Intrinsic Viscosity (30° C.) | | Color Tone | |
| | Symbol | Phosphate | weight)[1] | (ppm)[2] | Polyester | Stabilizer[3] | (dL/g) | L* | a* | b* |
| Example 1 | A | a | 0.1 | 6.5 | a-1 | none | 0.611 | 66.7 | −1.2 | 2.4 |
| Example 2 | B | a | 1 | 6.5 | b-1 | none | 0.610 | 66.5 | −1.1 | 2.3 |
| Example 3 | C | a | 10 | 6.5 | c-1 | none | 0.623 | 66.0 | −0.9 | 2.3 |
| Example 4 | D | a | 20 | 6.5 | d-1 | none | 0.615 | 65.4 | −1.0 | 2.1 |
| Example 5 | E | a | 50 | 6.5 | e-1 | none | 0.627 | 65.1 | −0.8 | 2.1 |
| Example 6 | F | a | 100 | 6.5 | f-1 | none | 0.624 | 65.0 | −0.8 | 2.7 |
| Example 7 | E | a | 50 | 2.0 | g-1 | none | 0.625 | 66.2 | −1.0 | 2.5 |
| Example 8 | E | a | 50 | 10.0 | h-1 | none | 0.620 | 66.0 | −1.1 | 2.9 |
| Example 9 | E | a | 50 | 20.0 | i-1 | none | 0.635 | 66.7 | −1.1 | 3.8 |
| Example 10 | E | a | 50 | 6.5 | j-1 | (a) | 0.626 | 65.1 | −0.8 | 1.9 |
| Example 11 | E | a | 50 | 6.5 | k-1 | (b) | 0.626 | 65.4 | −0.6 | 1.8 |
| Example 12 | G | b | 50 | 6.5 | l-1 | none | 0.626 | 64.7 | −0.9 | 2.6 |

| | Solid-Polycondensate Polyester | | | | |
|---|---|---|---|---|---|
| | | Intrinsic Viscosity (30° C.) | Color Tone | | Crystallization Temperature |
| | Polyester | (dL/g) | L* | a* b* | (° C.) |
| Example 1 | a-2 | 0.709 | 87.5 | −1.1  3.5 | — |
| Example 2 | b-2 | 0.714 | 88.1 | −1.1  3.6 | 148.1 |
| Example 3 | c-2 | 0.718 | 87.7 | −1.2  3.7 | — |
| Example 4 | d-2 | 0.715 | 87.8 | −1.3  3.6 | 153.9 |
| Example 5 | e-2 | 0.751 | 88.2 | −1.3  3.8 | 156.3 |
| Example 6 | f-2 | 0.760 | 88.7 | −1.4  4.1 | — |
| Example 7 | g-2 | 0.731 | 87.1 | −1.2  3.0 | 159.5 |
| Example 8 | h-2 | 0.745 | 86.7 | −1.6  4.6 | — |
| Example 9 | i-2 | 0.759 | 85.5 | −1.6  5.3 | 158.6 |
| Example 10 | j-2 | 0.742 | 87.7 | −1.2  3.2 | — |
| Example 11 | k-2 | 0.762 | 87.7 | −1.2  3.5 | — |
| Example 12 | l-2 | 0.751 | 87.4 | −1.3  3.9 | 153.0 |

Notes

[1] Parts by weight relative to 100 parts by weight of phosphate

[2] Amounts in terms of titanium atom relative to the amount of polyester to be obtained

[3] (a) stands for phosphoric acid, and (b) stands for trimethyl phosphate

TABLE 2

| | Polycondensation Catalyst | | | | Melt-Polycondensate Polyester | | | | | |
|---|---|---|---|---|---|---|---|---|---|---|
| | | | Amount of Titanic Acid Coating (Parts by | Amount Used | | | Intrinsic Viscosity (30° C.) | Color Tone | | |
| | Symbol | Phosphate | weight)[1] | (ppm)[2] | Polyester | Stabilizer[3] | (dL/g) | L* | a* | b* |
| Example 13 | H | c | 50 | 6.5 | m-1 | none | 0.634 | 65.3 | −1.1 | 2.9 |
| Example 14 | I | d | 50 | 6.5 | n-1 | none | 0.619 | 64.6 | −0.7 | 2.2 |
| Example 15 | J | e | 50 | 6.5 | o-1 | none | 0.624 | 64.6 | −1.3 | 2.7 |
| Example 16 | K | f | 20 | 6.5 | p-1 | none | 0.625 | 65.5 | −1.1 | 3.0 |
| Example 17 | L | f | 50 | 6.5 | q-1 | none | 0.635 | 66.4 | −1.2 | 3.2 |
| Example 18 | L | f | 50 | 2.0 | r-1 | none | 0.615 | 66.8 | −1.1 | 3.3 |
| Example 19 | L | f | 50 | 10.0 | s-1 | none | 0.632 | 64.9 | −0.9 | 4.1 |
| Example 20 | M | g | 50 | 6.5 | t-1 | none | 0.624 | 64.1 | −0.9 | 2.5 |
| Comparative 1 | N | h | 50 | 6.5 | u-1 | none | 0.642 | 63.2 | −2.1 | 6.3 |
| Comparative 2 | N | h | 50 | 6.5 | v-1 | (a) | 0.620 | 65.0 | −1.1 | 3.1 |
| Comparative 3 | N | h | 50 | 6.5 | w-1 | (c) | 0.650 | 65.0 | −2.1 | 6.0 |
| Comparative 4 | Antimony Trioxide | | | — | x-1 | none | 0.634 | 59.2 | −0.5 | 3.0 |

| | Solid-Polycondensate Polyester | | | | | |
|---|---|---|---|---|---|---|
| | | Intrinsic Viscosity (30° C.) | Color Tone | | | Crystallization Temperature |
| | Polyester | (dL/g) | L* | a* | b* | (° C.) |
| Example 13 | m-2 | 0.772 | 87.0 | −1.4 | 4.1 | 154.6 |
| Example 14 | n-2 | 0.721 | 87.5 | −1.2 | 4.3 | 152.1 |
| Example 15 | o-2 | 0.762 | 87.7 | −1.5 | 4.2 | 155.1 |
| Example 16 | p-2 | 0.753 | 87.2 | −1.6 | 4.0 | 152.5 |
| Example 17 | q-2 | 0.775 | 87.1 | −1.4 | 4.3 | 151.4 |
| Example 18 | r-2 | 0.733 | 86.5 | −1.3 | 3.7 | — |
| Example 19 | s-2 | 0.787 | 86.2 | −1.3 | 5.5 | — |
| Example 20 | t-2 | 0.763 | 86.9 | −1.3 | 3.8 | 152.4 |
| Comparative 1 | u-2 | 0.854 | 85.8 | −1.2 | 8.6 | — |
| Comparative 2 | v-2 | 0.758 | 87.7 | −1.0 | 3.8 | — |
| Comparative 3 | w-2 | 0.854 | 86.0 | −1.4 | 7.8 | — |
| Comparative 4 | x-2 | 0.842 | 85.1 | −1.3 | 4.5 | 134.0 |

Notes
[1] Parts by weight relative to 100 parts by weight of phosphate
[2] Amounts in terms of titanium atom relative to the amount of polyester to be obtained
[3] (a) stands for phosphoric acid, and (c) stands for calcium pyrophosphate As clear from the results in Tables 1 and 2, Examples 1 to 9 and 12 to 20 show that the use of particles of water-insoluble or hardly water-soluble phosphate having a coating layer formed of titanic acid on the surfaces as a polycondensation catalyst according to the invention provided a melt-polycondensate polyester which had a small b* value in the L*a*b* color system even when a phosphorus-containing stabilizer was not added to the polycondensation reaction system during the polycondensation reaction, and which was colored yellow only to a small extent. Further according to the invention, Examples 10 and 11 show that, when particles of phosphate having a coating layer formed of titanic acid on the surfaces were used as a polycondensation catalyst, and a phosphorus-containing stabilizer was added to the polycondensation reaction system during the polycondensation reaction, there was obtained a melt-polycondensate polyester resin which had a smaller b* value and was colored yellow to a smaller extent.

In contrast, as shown in Comparative Example 1 in which particles of hydrotalcite having a coating layer formed of titanic acid on the surfaces were used as a polycondensation catalyst, but a phosphorus-containing stabilizer was not added to the polycondensation reaction system during the polycondensation reaction, the polyester obtained was found to have a larger b* value and colored yellow to a larger extent than those obtained in Examples 1 to 20 according to the invention.

Also shown in Comparative Example 2, when particles of hydrotalcite having a coating layer formed of titanic acid on the surfaces were used as a polycondensation catalyst, it was found to be necessary to add a phosphorus-containing stabilizer to the polycondensation reaction system during the polycondensation reaction in order to obtain a polyester having the same color tone as that of the polyesters obtained in Examples 1 to 9 and 12 to 20 according to the invention.

In Comparative Example 3, particles of hydrotalcite having a coating layer formed of titanic acid on the surfaces were used as a polycondensation catalyst, and calcium pyrophosphate, which was a carrier of the polycondensation catalyst according to the invention, was added to the polycondensation reaction system during the polycondensation reaction, thereby a polyester as mentioned below was obtained. As is apparent from the b* value of the obtained polyester, calcium pyrophosphate itself was found to have no effect as a stabilizer for improving the color tone of the polyester obtained. That is, according to the invention, the acid catalysis of titanic acid is moderately suppressed from the inside of the catalyst particles by coating the particles of a phosphate such as calcium pyrophosphate with titanic acid, and as a result, it seems that there is obtained a polyester superior in color tone.

In Comparative Example 4, antimony trioxide, which is known to be a typical conventional polycondensation catalyst, was used. It is generally known that a polyester resin obtained by using antimony trioxide as a polycondensation catalyst, has a small b* value and superior in color tone, as well as it is little colored yellow.

When particles of phosphate having a coating layer formed of titanic acid on the surfaces are used as a polycondensation catalyst according to the invention, as clear from the results in Examples 1 to 9 and 12 to 20, there is obtained a polyester which is colored yellow to an equal to or a smaller extent than that of the polyester obtained using antimony trioxide as a polycondensation catalyst, and which is reduced in coloring yellow, even if a phosphorus-containing stabilizer is not added to the polycondensation reaction system during the polycondensation reaction. Further, the polyester obtained according to the invention has an L* value greater than that of polyesters obtained using antimony trioxide as a polycondensation catalyst., and is superior in lightness, and thus superior in color tone.

In addition, the polyester obtained according to the invention contains the polycondensation catalyst therein which has a higher crystallization temperature when it is heated than the polyester containing antimony trioxide, as shown with the solid-polycondensate polyesters. In general, polyesters having a high crystallization temperature have a low crystallization rate. Thus, the polyester obtained according to the invention maintains its transparency for a longer time in the surrounding environment, than the polyesters containing antimony trioxide.

The invention claimed is:

1. A polycondensation catalyst for producing polyester by an esterification reaction or a transesterification reaction of a dicarboxylic acid or a dialkyl ester thereof and a glycol,
wherein the polycondensation catalyst comprises particles of a water-insoluble or hardly water-soluble phosphate having on a surface thereof a coating layer of titanic acid in an amount of 0.1 to 100 parts by weight in terms of $TiO_2$ per 100 parts by weight of the phosphate, and
wherein a maximum amount of the phosphate that is soluble in 100 g of water at a temperature of 25° C. is 2.00 g or less.

2. The polycondensation catalyst according to claim 1, wherein the phosphate is an orthophosphate, a metaphosphate, a pyrophosphate, a phosphate glass, a phosphite or a hypophosphite, and
a counter ion of the phosphate anion is at least one cation of a metal selected from the group consisting of alkaline earth metals, aluminum, titanium, zirconium, and zinc.

3. The polycondensation catalyst according to claim 2, wherein the alkaline earth metal is calcium or magnesium.

4. The polycondensation catalyst according to claim 1, wherein the phosphate is dibasic calcium phosphate, tribasic calcium phosphate, calcium pyrophosphate, calcium dihydrogenpyrophosphate, magnesium pyrophosphate or magnesium metaphosphate.

5. The polycondensation catalyst according to claim 1, wherein the particles of the phosphate have on the surface thereof the coating layer formed of titanic acid in the amount of 1 to 50 parts by weight in terms of $TiO_2$ per 100 parts by weight of phosphate.

6. A method for producing polyester, comprising subjecting a dicarboxylic acid or a dialkyl ester thereof and a glycol to polycondensation by an esterification reaction or a transesterification reaction in the presence of the polycondensation catalyst according to claim 1.

7. A method for producing polyester comprising preparing oligomers containing a bis(hydroxyalkyl) ester of an aromatic dicarboxylic acid by an esterification reaction or a transesterification reaction of the aromatic dicarboxylic acid or a dialkyl ester thereof and an alkylene glycol, and then subjecting the oligomers to melt-polycondensation in the presence of the polycondensation catalyst according to claim 1.

8. A method for producing polyester comprising subjecting a dicarboxylic acid or a dialkyl ester thereof and a glycol to polycondensation by an esterification reaction or a transesterification reaction in the presence of the polycondensation catalyst according to claim 1, wherein the polycondensation catalyst is present in an amount of 1 to 40 ppm in terms of titanium atom based on a weight of the polyester.

9. A method for producing polyester comprising preparing oligomers containing a bis(hydroxyalkyl) ester of an aromatic dicarboxylic acid by an esterification reaction or a transesterification reaction of the aromatic dicarboxylic acid or a dialkyl ester thereof and an alkylene glycol, and then subjecting the oligomers to melt-polycondensation in the presence of the polycondensation catalyst according to claim 1, wherein the polycondensation catalyst is present in an amount of 1 to 40 ppm in terms of titanium atom based on a weight of the polyester.

10. A method for producing the polycondensation catalyst for producing polyester according to claim 1, comprising:
while maintaining a water slurry containing water-insoluble or hardly water-soluble particles of a phosphate at a temperature in a range of 5 to 100° C., adding to the water slurry a titanium compound in an amount of 0.1 to 100 parts by weight in terms of $TiO_2$ relative to 100 parts by weight of the phosphate, and adding an alkali to the resulting mixture to hydrolyze the titanium compound at a pH in a range of 3 to 12 to form a coating layer of titanic acid on surfaces of the particles of the phosphate; and
drying and disintegrating the particles of the phosphate having the coating layer on the surfaces,
wherein a maximum amount of the phosphate that is soluble in 100 g of water at a temperature of 25° C. is 2.00 g or less.

* * * * *